United States Patent
Gregory et al.

(10) Patent No.: US 7,917,535 B1
(45) Date of Patent: Mar. 29, 2011

(54) TASK MEMBERSHIP AND TASK MASKS

(75) Inventors: Eric Gregory, Larkspur, CA (US);
Michael Ferris, Sunnyvale, CA (US);
Robert Jensen, Berkeley, CA (US);
Oren Jacob, Piedmont, CA (US);
Timothy S. Milliron, Menlo Park, CA (US)

(73) Assignee: Pixar, Emeryville, CA (US)

( * ) Notice: Subject to any disclaimer, the term of this patent is extended or adjusted under 35 U.S.C. 154(b) by 449 days.

(21) Appl. No.: 12/042,249

(22) Filed: Mar. 4, 2008

(51) Int. Cl.
*G06F 7/00* (2006.01)
*G06F 17/30* (2006.01)

(52) U.S. Cl. ........................ 707/791; 707/802
(58) Field of Classification Search .......... None
See application file for complete search history.

(56) References Cited

U.S. PATENT DOCUMENTS 5,680,619 A * 10/1997 Gudmundson et al. ....... 717/108
2004/0056908 A1 * 3/2004 Bjornson et al. ............ 345/968

* cited by examiner

*Primary Examiner* — Kuen S Lu
*Assistant Examiner* — Tuan Pham
(74) *Attorney, Agent, or Firm* — Law Office of Jonathan Hollander PC

(57) ABSTRACT

Components are presented to users based on the components' assigned task memberships. The tasks represents the different activities performed by users within a digital production pipeline. Each stage of the digital production pipeline may be associated with a task. Additional user-defined tasks may be defined as needed to further distinguish components. Attributes of components are associated with one or more tasks when the component is authored. Task memberships may be inherited from parent components or overridden. A user interface includes a task selection menu to receive a selection of one or more tasks from the user. The task selection is used to filter components, so that the user interface presents only relevant information to users. Component attribute values and task associations can be expressed using layer data structures. Task restrictions of layers allow layers to only specify values of components that match the task associations of the layer.

17 Claims, 8 Drawing Sheets

TASK MEMBERSHIP AND TASK MASKS

CROSS-REFERENCES TO RELATED APPLICATIONS

This application is related to U.S. patent application Ser. Nos. 11/738,953, entitled "Layering and Referencing in Scene Description, filed Apr. 23, 2007, and 11/759,919 entitled "Graphs of Components in Digital Productions, filed Jun. 7, 2007, both of which are all incorporated by reference herein for all purposes

BACKGROUND OF THE INVENTION

The present invention relates to the field of computer graphics, and in particular to methods and apparatus for creating, modifying, and using components to create computer graphics productions. Many computer graphic images are created by mathematically modeling the interaction of light with a three dimensional scene from a given viewpoint. This process, called rendering, generates a two-dimensional image of the scene from the given viewpoint, and is analogous to taking a photograph of a real-world scene. Animated sequences can be created by rendering a sequence of images of a scene as the scene is gradually changed over time. A great deal of effort has been devoted to making realistic looking and artistically compelling rendered images and animations.

Computer graphics images, animations, and other productions involving computer graphics, such as interactive entertainment software, are created from a number of different components. Generally, components include any data and instructions used to create products and applications that include computer graphics. Components can include three-dimensional models of geometry; texture maps, other arrays of data, lighting, and shading programs used to determine the visual appearance of models; and animation data and deformer functions used to specify changes and motion over time. One or more components are typically stored as a digital asset. A digital asset can be a file, database table, executable program or script, or any other type of persistent data store.

Components typically include one or more attributes containing data associated with the component. Attributes can specify any static or varying property of a component. For example, a component may be a model of a sphere. Attributes of this example component could describe properties such as the radius of the sphere and the location of the center of the sphere. Different types of components may include different numbers and types of attributes. The structure and arrangement of the set of attributes associated with a component is referred to as the semantic structure of the component. Different components may have different semantic structures, based on the type of component and its intended use.

Digital production pipelines include modeling, shading, articulation, animation, simulation, layout, lighting, and rendering. Modeling is the creation of the three-dimensional geometry of characters, sets, props, and other objects. Shading is the specification of optical attributes of the surface and interior of objects. Articulation is the specification of joints and other moveable elements of objects. Animation specifies the motion of objects over time in one or more scenes, often with reference to the objects' articulation. Simulation specifies the motion, appearance, and/or behavior of objects. Layout specifies the arrangement of objects and cameras in one or more scenes. Lighting defines the location and other attributes of light in one or more scenes. Rendering produces images or animation from the components.

Users at each stage of the digital production pipeline create or modify numerous components to be used in creating a computer graphics image, animation, or other type of production using one or more software application tools. Components are typically combined during rendering to produce an animated sequence. For example, geometric models, shading programs and data, lighting, animation data, and deformers all need to be combined correctly to produce a rendered image or scene.

Users may be presented with hundreds or thousands of components at each stage of the digital production pipeline. Although necessary to the production, many of these components may be irrelevant to the current stage of the digital production pipeline. Displaying a large number of irrelevant components can hinder a user's ability to perform a task. A large number of irrelevant components can also hinder the performance of software application tools, further decreasing a user's productivity.

Prior software application tools included manual techniques for hiding components from users. Often, such manual selection interfaces are error-prone and cumbersome to use and require users to spend substantial time selecting components to be hidden.

Some prior software application tools could hide components based on the specification of filters based on component types. Typically, prior software application tools enabled filtering of components by component type or by components related to each other in a tree data structure. These types of filters may reduce the number of irrelevant components being displayed; however, this reduction is often insufficient for complex productions. Users at each digital production pipeline stage often manipulate components of many different types. Thus, component filtering based on component types is often either overinclusive or underinclusive in selecting relevant components at each digital production pipeline stage. As a result, users must spend substantial time changing or adjusting filters to access the relevant components. Furthermore, component filters based on more complicated queries may miss critical components or become out of date as the production evolves. Additionally, prior software application tools often associate components with application functions. As a result, filters often unnecessarily limit their functionality when filtering components, hindering user productivity.

Moreover, different attributes of a component may be relevant to different stages of the digital production pipeline. For example, the deformer components used to animate a character model may be accessed in the articulation stage of the digital production pipeline, where it is created, and the animation stage of the digital production pipeline, where an animator uses the deformer component to create animation. Many attributes of this example deformer component may be irrelevant to users in the animation stage. Moreover, users in the animation stage that modify these irrelevant attributes may inadvertently introduce errors that break their own and others work. However, the filtering provided by prior software applications is too coarse to effectively present only relevant portions of components at each stage of the digital production pipeline.

It is therefore desirable for a system and method to present components or portions thereof that are relevant to each stage of the digital production pipelines without including substantial numbers of irrelevant components. It is further desirable for the system and method to easily specify relevant components or portions thereof in a consistent manner that does not require frequent adjustments. It is also desirable for the system and method to enable the enforcement of policies about the locations in the digital production pipeline where components and portions thereof can or cannot be accessed or modified to prevent the inadvertent introduction of errors.

BRIEF SUMMARY OF THE INVENTION

An embodiment of the invention presents components to the user based on the components' assigned task values. The set of tasks represents the different activities performed by users within a digital production pipeline. Typically, each stage of the digital production pipeline is associated with at least one task. For example, the modeling, articulation, shading, animation, layout, lighting, and simulation stages of the digital production pipeline may each be associated with a different task. Additional user-defined tasks may be defined as needed to further distinguish components. Attributes of components are associated with one or more tasks when the component is authored. Task associations may be inherited from parent components or overridden.

In an embodiment, a user interface of a digital production pipeline application includes a task selection menu adapted to receive a selection of one or more tasks from the user. The task selection is used to filter components or attributes thereof, so that the user interface presents only relevant information to users. Additionally, the task selection may be used to modify the user interface to enable additional task-related functions or to modify the behavior of existing functions.

In an embodiment, component attribute values, including task associations, can be expressed using sparsely populated layer data structures. Each layer data structure includes one or more opinions of value of attributes of one or more components. Layers can override opinions of attribute values from weaker or lower-level layers. In a further embodiment, layers can include their own task restrictions. In this embodiment, a layer can only specify values of components and attributes that match the task restrictions of the layer. This enables layers to enforce access and modification policies for components and their attributes.

BRIEF DESCRIPTION OF THE DRAWINGS

The invention will be described with reference to the drawings, in which.

DETAILED DESCRIPTION OF THE INVENTION

An embodiment of the invention defines a set of tasks to be used to select and present components to the user. The set of tasks represents the different activities performed by users within a digital production pipeline. Typically, each stage of the digital production pipeline is associated with one or more tasks. For example, the modeling, articulation, shading, animation, layout, lighting, and simulation stages of the digital production pipeline may each be associated with a different task. Additional specialized tasks may be defined for additional stages of the digital production pipeline, such as a special effects stage; for specialized activities within a stage, such as a character with a specialized set of animation controls; and for specific portions of the production, such as a particular scene or group of scenes requiring special attention.

Figure 4:
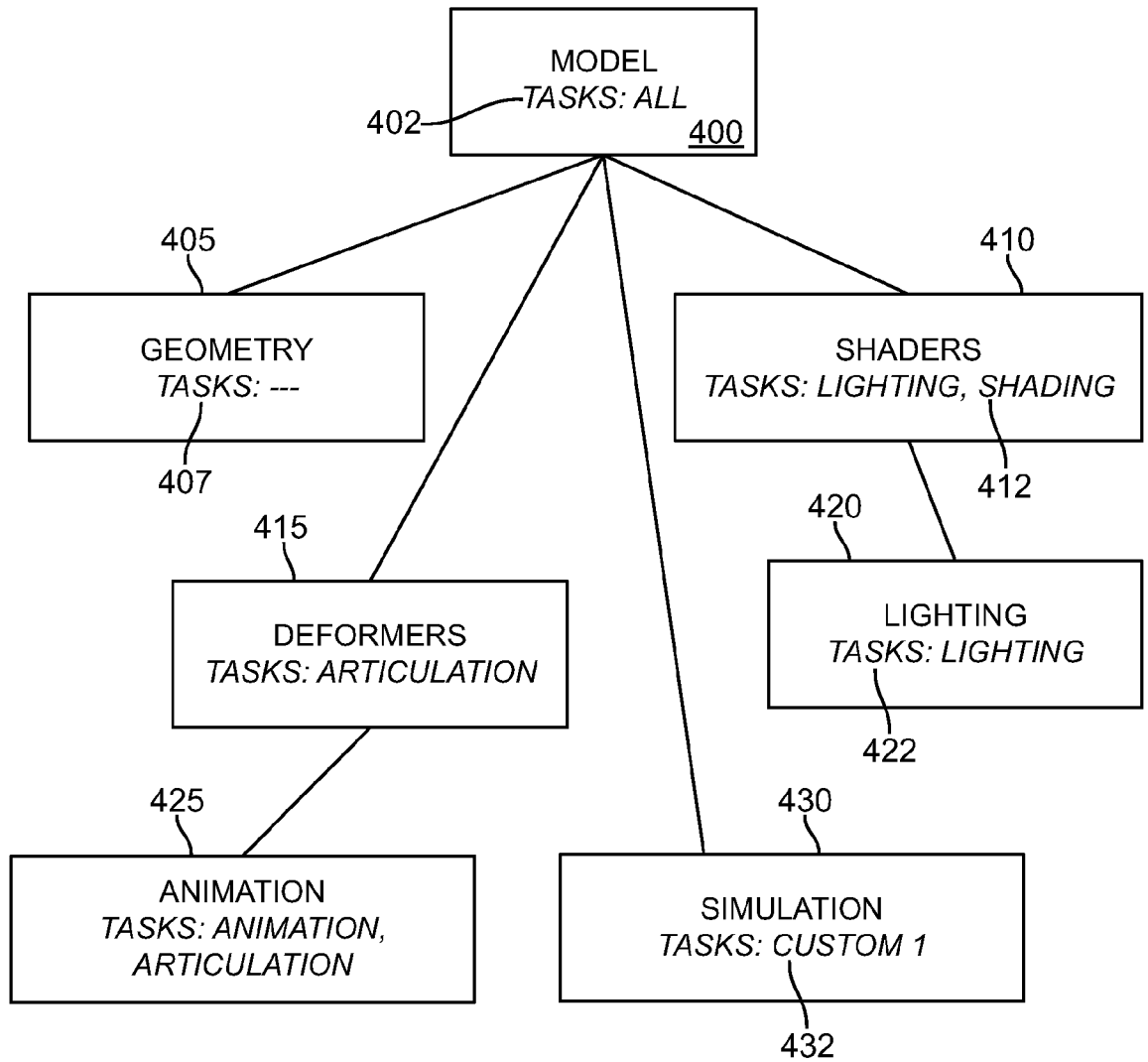
FIG. 4 illustrates example components according to an embodiment of the invention.

In an embodiment, components are associated with one or more tasks when the component is authored. Component attributes or sub-components may be associated with one or more of the set of tasks based on task membership attributes of the component. FIG. 4 illustrates an example component 400 according to an embodiment of the invention. Example component 400 represents an object to be used in creating computer graphics productions; however, embodiments of the invention can be used with components for any application. Component 400 includes, among its other attributes, a task membership attribute 402. Task membership attribute 402 specifies the association of component 400 with one or more of the set of tasks. In this example, task membership attribute 402 is set to "ALL", indicating that component 400 is associated with each of the set of tasks.

Example component 400 is associated with several example child components, including geometry component 405, defining a three-dimensional model; shaders component 410, defining shading programs and/or texture maps; deformer component 415, defining the articulation or changes to the model in response to animation variable inputs; lighting component 420, defining lights and illumination relationships with the model; animation component 425, specifying animation variable values to animate the model in one or more scenes; and simulation component 430, specifying simulations or other algorithms used to define the motion or appearance of the component 400. An example implementation of relationships between components is described in detail below with reference to FIG. 3.

In an embodiment, each child component can inherit task membership values from one or more parent components. For example, child component 405 can inherit its task membership value 407 from component 400 and its task membership value 402. In a further embodiment, child components can augment or override task membership values from parent components. For example, lighting component 420 has a task membership value 422 set to "LIGHTING", which indicates that lighting component 420 is only associated with lighting task.

In an embodiment, the task membership values of components can be set to any arbitrary combination of tasks. For example, shader component 410 has a task membership value 412 of "LIGHTING, SHADING", which indicates that shader component 410 is associated with both the lighting and shading tasks.

In an embodiment, new tasks can be defined as needed to further distinguish components. For example, simulation component 430 has a task membership value 432 of "CUSTOM 1", which is specialized task defined by a user. In an embodiment, new specialized tasks can be defined at any arbitrary stage of the digital production pipeline without disrupting any other stage of the digital production pipeline or impacting unrelated components.

In an embodiment, a single task membership value can be specified for a component. In this embodiment, all of the attributes of the component are associated with the task or tasks defined by the component's task membership value. In another embodiment, a component can include multiple task membership values, each task membership value associating all or a portion of the attributes of the component with one or more tasks. In still another embodiment, each attribute of the component has a corresponding task membership value, which specifies the association of this attribute of the component with one or more tasks.

In an embodiment, task membership values of components can be set at the time the components are created. In a further embodiment, the task membership values of components can be modified at any stage of the digital production pipeline. In still a further embodiment, task membership values, as well as any other attribute values of components, can be modified using layers as described in detail below with reference to FIGS. 2 and 3.

Figure 5:
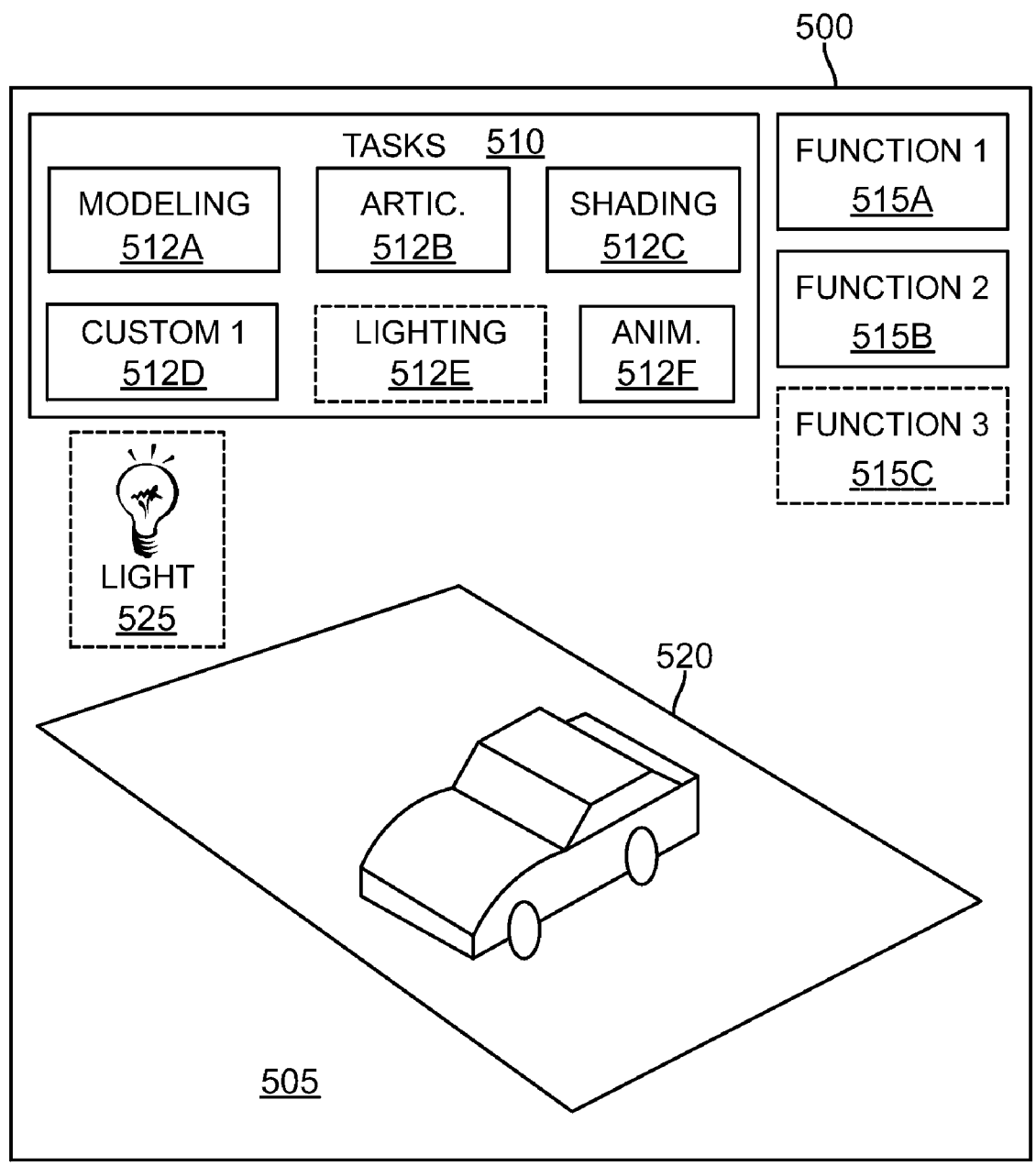
FIG. 5 illustrates a user interface according to an embodiment of the invention.

FIG. 5 illustrates a user interface 500 according to an embodiment of the invention. User interface includes a main viewing area 505 for presenting one or more components or attributes thereof to a user. Embodiments of the main viewing area 505 may present components and their attributes to users in a number of different formats, including in the form of text, tables, timelines, charts, graphs, images, and renderings from one or more viewpoints.

To ensure that user interface 500 presents relevant components to the user, an embodiment of user interface 500 includes a task selection menu 510. Task selection menu 510 includes one or more task selection buttons 512 or other types of user interface elements. In an embodiment, task selection menu 510 includes task selection buttons 512 corresponding to each of the set of tasks defined in the digital production pipeline. For example, task selection menu 510 includes modeling task selection button 512A, articulation task selection button 512B, shading task selection button 512C, custom 1 task selection button 512D, lighting task selection button 512E, and animation task selection button 512F. These task selection buttons 512A-512F correspond with the set of tasks defined for example component 400 discussed above. In a further embodiment, task selection menu 510 includes only a subset of the set of tasks, determined, for example, by typical usage patterns of a user or of a user's department or by any other criteria.

In response to a user selecting one of the task selection buttons 512, a software application utilizing user interface 500 will identify the components or portions of components having task membership values matching the user's task selection. The software application will then present only these identified components to the user via user interface 500. For example, if the user selects the shading task selection button 512E, the user interface 500 will only present components to the user that have a task membership value including the "LIGHTING" task, such as light component 525. The selection of one or more tasks may alter the user interface within a single application or across multiple applications.

In a further embodiment, the user may select multiple tasks to present components associated with different tasks at the same time. For example, if the user selects both the shading 512C and lighting 512E task selection buttons, the user interface 500 will only present components to the user that have a task membership value including either the "SHADING" or "LIGHTING" tasks. In this example, the user interface may display shading component 520 and light component 525. By selecting multiple tasks, the user is able to perform cross-workflow activities.

An embodiment uses a bit field or other similar type of data structure to identify and select components to be presented to users according to the task selection. In this embodiment, the task membership value of a component or of an individual attribute thereof is specified using a bit field, with each bit of the bit field corresponding with one of the set of tasks. Each bit of the bit field is set or cleared depending on whether the component or attribute is associated with its corresponding task. Similarly, the task selection buttons 512 define the value of a task selection mask. The results of a bitwise Boolean operation, such as an AND, between the task selection mask and the task membership value of a component or attribute thereof, determines whether the component should be presented to the user via the user interface 500.

In a further embodiment, the task selection menu 510 and task selection buttons 512 can be used to change the user interface 500. For example, user interface 500 includes several function buttons or other user interface elements 515, which are used to initiate functions on one or more selected components or portions thereof. In this embodiment, the selection of specific task selection buttons 512 may change the types, arrangement, and/or behavior of the function buttons 515. For example, the user interface 500 may always display function buttons 515A and 515B. Upon selecting the lighting task selection button 512E, an example of user interface 500 will add function button 515C to the set of function buttons 515. Further examples of the user interface 500 may also change the format used to display components in main viewing area 505 in response to the user's selection of task selection buttons 512.

Figure 1:
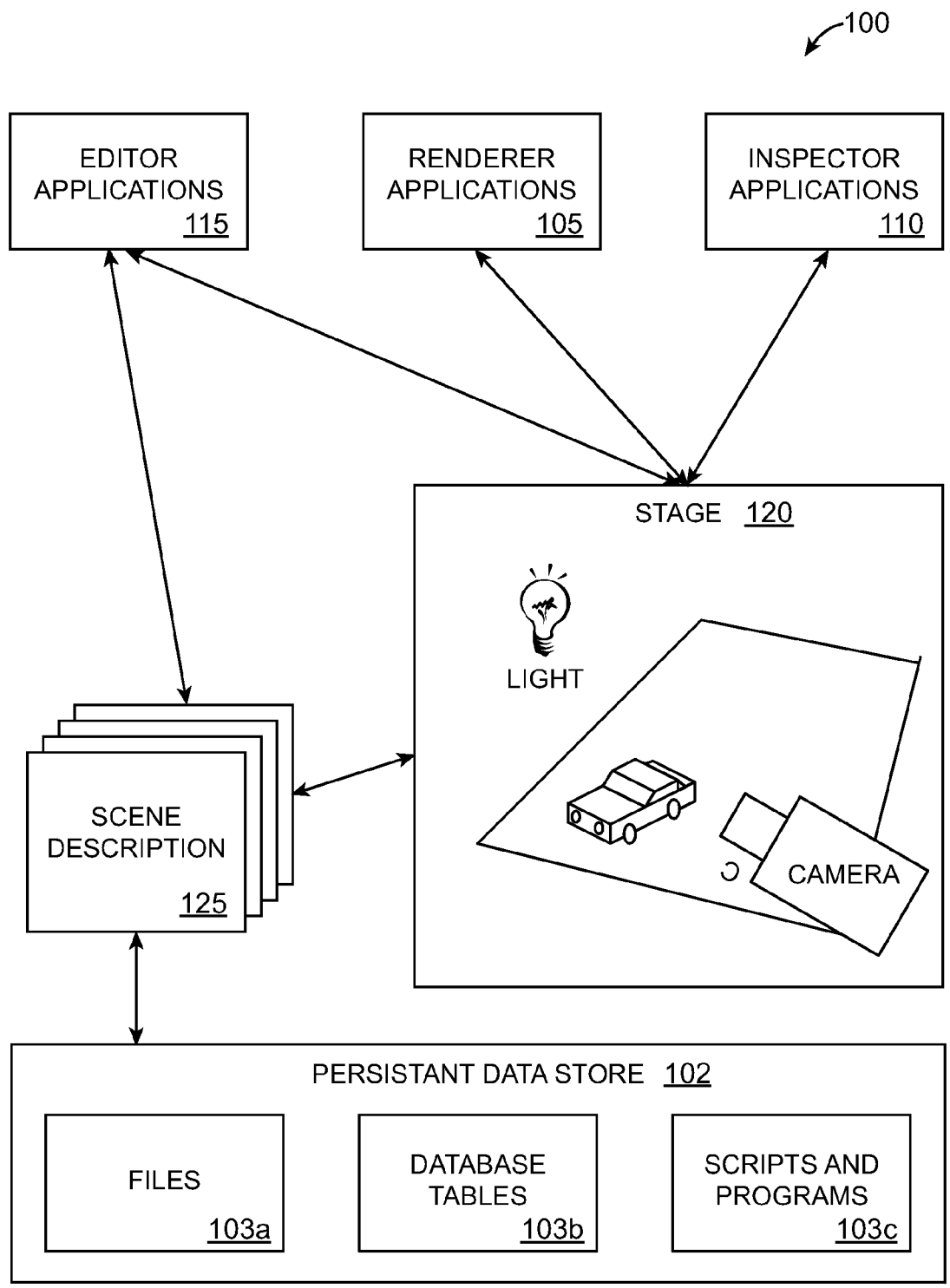
FIG. 1 illustrates a system for creating, modifying, and accessing components in a digital production pipeline according to an embodiment of the invention.

Embodiments of the task membership values of components and the user interfaces described above can be applied to any type of system or software application used in any stage of a digital production pipeline. As an example, FIG. 1 illustrates a system 100 for creating, modifying, and accessing components in a digital production pipeline according to an embodiment of the invention. However, applications of embodiments of the invention are not limited to system 100.

System 100 includes a number of applications for creating, viewing, modifying, and processing digital assets and their components. Examples of these applications include renderer applications 105, inspector applications 110, and editor applications 115. Renderer applications 105 are adapted to process components to create one or more images. Renderer applications 105 can utilize any rendering techniques or combinations of techniques known in the art, including ray casting and ray tracing, scanline rendering, rasterization, and image based rendering. Renderer applications 105 can produce images at interactive frame rates or at substantially slower rates depending upon the rendering technique, the available computing resources, and the desired degree of visual detail. Renderer applications 105 can also edit and combine sequences of animation.

Inspector applications 110 are adapted to present users with the state of one or more components. The state of components can include the values of one or more attributes. Attributes can define all aspects of a component, including whether the component itself is active, or is present, in a scene. In some applications, the association of a component or attributes thereof with one or more tasks is expressed as a task membership attribute, as described above. Additionally, the state of components can change over time within an animated sequence and at different points in the digital production pipeline. Inspector applications 110 may present state information of components in a number of different formats, including in the form of text, tables, timelines, charts, graphs, images, and renderings from one or more viewpoints.

Editor applications 115 are adapted to create and modify the state of one or more components. Editor applications 115 can utilize interfaces adapted to manipulate data in the form of text, tables, timelines, charts, graphs, images, and renderings from one or more viewpoints to create components and modify their attributes. Additionally, a user can input attribute values directly using any type or combination of input devices well known in the art, including keyboards, mice, and digitizer tablets. Additionally, editor applications 110 can analyze user input to indirectly set or modify one or more attribute values. For example, a user input could be processed by a filtering algorithm in an editor application to modify several attributes simultaneously in varying amounts.

Example applications 105, 110, and 115 can be combined into hybrid applications that perform inspector, editor, and/or renderer functions together. In an embodiment, system 100 includes an application programming interface enabling any additional applications to access and modify components.

Digital production pipeline applications, such as example applications 105, 110, and 115, can store and retrieve components in digital assets, such a files, 103*a*; database tables, 103*b*; and scripts and programs, 103*c*. The digital production pipeline applications can create new digital assets to hold one or more components, modify existing digital assets to add, remove, or modify components, remove unneeded digital assets, and encapsulate one or more digital assets in another digital asset. Digital assets 103*a*, 103*b*, and 103*c* are stored by persistent data store 102, which can be comprised of data storage devices of any type.

In an embodiment, system 100 includes a stage 120. The stage 120 includes an instantiation of the complete state of one or more components for at least one scene. This can include a component such as a model, a light, or a camera; articulation and animation data; a supporting component such as a texture map or a shader; or any combination of components. As discussed below, the stage 120 instantiates the complete state of one or more components for one or more scenes. System 100 can instantiate components on stage 120 for use at any point in the digital production pipeline. Components may take on different states, or augment their initial state with additional attributes, at different points of the digital production pipeline. Applications 105, 110, and 115 can create, access, and modify the state of components for one or more scenes via stage 120.

To maintain state information for components for one or more scenes at any arbitrary location in the digital production pipeline, an embodiment of the system 100 represents components as a unified scene description 125. For each component, the unified scene description 125 includes at least one opinion of the value of each of its attributes for one or more scenes, with the exception of any application-supplied or default values. To determine the state of a component for one or more scenes at a given location in the digital production pipeline, the system 100 processes the unified scene description 125 to identify the most appropriate opinions of attribute values for each component. The system 100 reconstructs or instantiates components in the stage 120 using the set of opinions of attribute values associated with each component (as well as any application-supplied or default values, if necessary) at the given location in the digital production pipeline.

Figure 2:
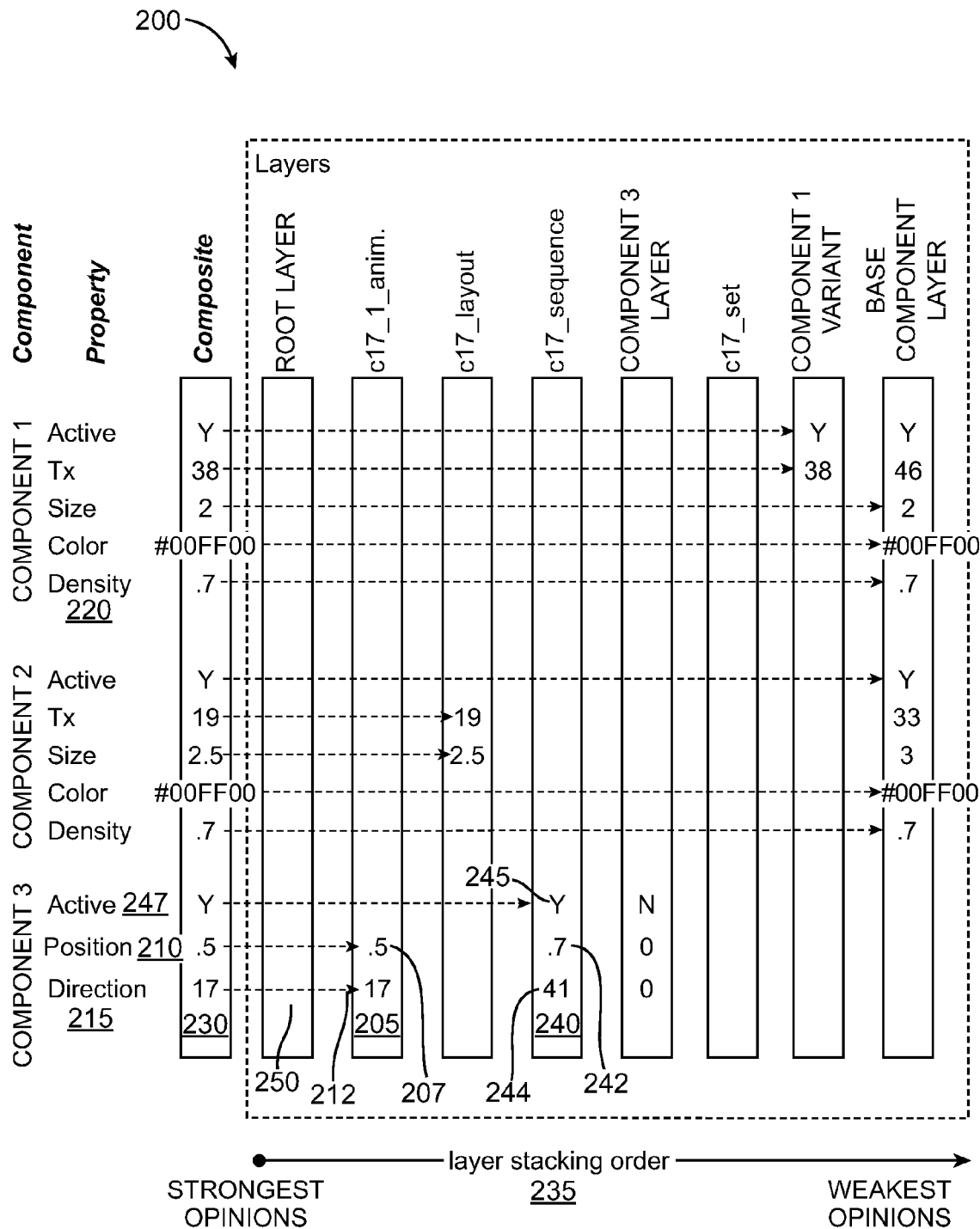
FIG. 2 illustrates a layers data structure specifying attributes of components according to an embodiment of the invention.

FIG. 2 illustrates a layers data structure 200 specifying attributes of components in one or more scenes according to an embodiment of the invention. In an embodiment, a component in one or more scenes is represented using one or more layers of a layer data structure. The layer data structure stores opinions of attribute values for a component. In this embodiment, each non-empty layer is adapted to include an opinion of the value of at least one attribute of at least one component. As discussed in detail below, each layer can override opinions of attribute values from weaker or lower-level layers.

Each layer may be sparsely populated—that is, a layer does not have to include every component in a scene and, moreover, a layer does not have to include opinions for the values of every attribute of any component. Each layer can specify an opinion of value for a new attribute of a component without having that attribute explicitly declared by a prior layer. A layer can include opinions of value for attributes of multiple components. Additionally, empty layers can be created in early stages of the digital production pipeline as placeholders for opinions of attribute values to be provided at later stages of the digital production pipeline.

In example layer data structure 200, layer 205 includes an opinion 207 that the position attribute 210 of component 3 should be set to a value of 0.5 and an opinion 212 that the direction attribute 215 of component 3 should be set to a value of 17. As can be seen in this example, the opinions of value of other attributes, such as the density attribute 220 of component 1 is undefined in layer 205.

In the above example, attribute values are numerical parameters. However, embodiments of layer data structure 200 allow the specification of any data type for an attribute value, including integers; floating point numbers; characters; strings; Boolean values; geometry data; compound data types such as vectors with two or more dimensions, matrices, structures, arrays, dictionaries, hash tables, elements of edit decision lists; references to one or more components; references to one or more layers; references to elements, tables, or other structures of a database; and references to internal or external functions, scripts, or executable programs.

Layers provide opinions of value for attributes of components in terms of the semantic structure associated with the components. Any arbitrary abstract attribute of a component can be expressed in a layer. Furthermore, one or more layers can provide opinions of value for the attribute of a component in the unique terms or semantic structure defined for that attribute. There is no need to reduce opinions of value of abstract attributes to a common or low-level form, such as pixels or points, to composite the values.

For example, a first layer can specify a model of a character wearing a hat. One attribute of the hat could be its type, such as "sombrero." Thus, the first layer could set a "hat type" attribute of the component to a value of "sombrero." Thus, from the view of the first layer, the character model should have a sombrero. A second layer that is higher or stronger than the first layer could change the hat type attribute of the component from "sombrero" to "top hat." Thus, from the view of the second layer, the character model should have top hat. A third layer that is higher or stronger than the second layer could specify that a color attribute of the hat should be "purple" and a material attribute should be "felt." Thus, from the view of the third layer, the character should have a purple felt top hat. In this example, each layer expresses an opinion of one or more attribute values in terms of the semantics associated with each attribute.

Furthermore, a component may include a reference to another component defined by one or more layers. For example, a Hat component of a character model can be a reference to a specific model of a hat. Thus, when reference is set to a "sombrero" component, the character model includes a model of a sombrero. When the reference is overridden by a layer to a "top hat" component, the character model is changed to include a model of a top hat. Each of these models can be defined by one or more layers, the attributes of which can be wholly or partially or overridden by other layers as described above.

In an embodiment, every layer in the digital production pipeline is associated with one or more tasks or activities. Users can create and manipulate layers manually to provide additional control and ease of use for a component. For example, the attributes of different models can be specified in separate layers. In another example, related attribute values for different models in a scene can be specified in the same layer to facilitate easy manipulation. In an embodiment, applications associated with activities can automatically create, access, and modify layers based on context, such as the activity, the type of component, and the action being performed by the user.

The complete authored state of one or more components in one or more scenes at a given point of the digital production pipeline is determined by compositing all of the layers associated with a given point to produce a composite layer 230. The composite layer 230 includes opinions of attribute values for the attributes specified by one or more of the associated layers. The composite layer 230 can also be referred to as a composite scene description.

In an embodiment, a layer stacking order 235 determines the order in which layers are composited. This in turn specifies how attribute values in one layer override corresponding attribute values in other layers. In an embodiment, layers are assigned a strength in absolute or relative terms. For example, a first layer can include a relative strength value indicating that it is stronger than or weaker than one or more other layers. In this embodiment, opinions of attribute values in stronger layers will be at the "top" of the stacking order and will override opinions of attribute values in weaker layers, i.e. layers that are "lower" in the stacking order. The example layer stacking order 235 is a linear order; however, more complicated layer stacking orders with multiple branches can be utilized. In an embodiment, layer stacking orders can be set or modified by digital production pipeline applications, either manually by a user or automatically by applications. In a further embodiment, the strength of layers is defined at least in part with respect to a root layer, such as root layer 250, which is by default the strongest or highest level layer.

In example layer data structure 200, layer 240 includes opinions 242 and 244 of the value of attributes 210 and 215. However, stacking order 235 places layer 205 as stronger than or ahead of layer 240. Thus, in the composite layer 230, the opinions of value 207 and 212 of layer 205 for attributes 210 and 215 will override corresponding opinions 242 and 244 in layer 240. However, as layer 205 does not define an opinion of value for attribute 247 of component 3, the opinion 245 in layer 240 will define the value of attribute 247 in the composite layer 230.

Figure 6:
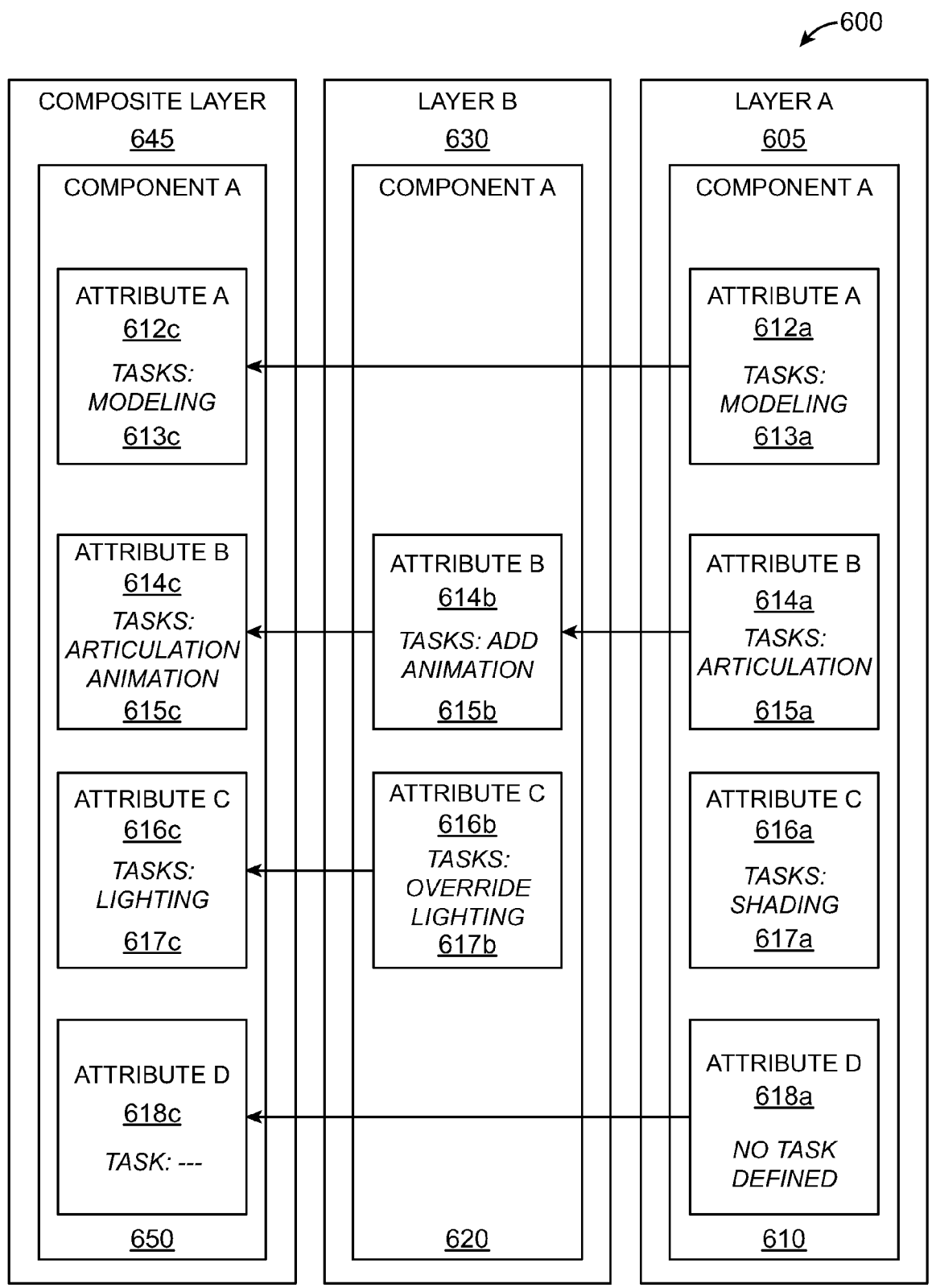
FIG. 6 illustrates an example set of layers adapted to specify task attributes of components.

In another example, task membership values can be assigned, modified, and overridden entirely or in part by layer data structures. FIG. 6 illustrates an example set of layers 600 adapted to specify task membership attributes of components. The example set of layer data structures 600 includes a first layer data structure, layer A 605, and a second layer data structure, layer B 630. In this example, layer B 630 is stronger than layer A 605 and thus may override or augment opinions of value specified by layer A 605. Layer A 605 specifies a first set 610 of opinions of value for attributes of component A.

In this example, the component A includes at least attributes A 612, B 614, C 616, and D 618. The first set 610 of opinions of values associate task membership attributes with these component attributes by including opinions of value for task membership attributes associated with the attributes of component A. In this example, layer A 605 sets the task membership attribute 613*a* of attribute A 612*a* to "modeling," the task membership attribute 615*a* of attribute B 614*a* to "articulation," the task membership attribute 617*a* of attribute C 616*a* to "shading." Layer A 605 does not specify any task membership attribute for attribute D 618*a*.

Layer B 630 includes a second set 620 of opinions of values for attributes of component A. In this example, layer B 630 sets the task membership attribute 615*b* of attribute B 614*b* to add the task of "modeling." Layer B 370 will add a task membership attribute set to "modeling" to this attribute, but will not delete or override any other task membership attributes associated with this attribute in weaker layers, such as layer A 605. Layer B 630 also sets the task membership attribute 617*b* associated with attribute C 616*b* to override other any other task membership values set by weaker layers and set this task membership attribute 617*b* to a value "lighting." Layer B 630 overrides any task membership values of attribute C 616*b* set by weaker layers such as layer A 605.

Layers A 605 and B 650 can be composited to define a composite layer 645 that specifies the authored state 650 of component A. The authored state 650 of component A is the complete set of attribute values of the component apart from any default or application-provided fallback attribute values for one or more components. In this example, the authored state 650 of the component A includes attributes A 612*c*, B 614*c*, C 616*c*, and D 618*c*.

Additionally, layers A 605 and B 630 associate task membership attributes with the attributes of component A. In this example, the authored state 650 of component A associates a task membership attribute 613*c* set to "modeling" with attribute A 612*c*. This task membership attribute 613*c* is determined by the opinion of value 613*a* from layer 605. Similarly, the authored state 650 of component A associates a task membership attribute 615*c* set to "articulation" and "animation" with attribute A 612*c*. This task membership attribute 615*c* is determined by the opinion of values 615*a* and 615*b* from layers 605 and B 630. The authored state 650 also associates a task membership attribute 617*c* set to "lighting" with attribute C 616*c*. This task membership attribute 617*c* is determined by opinion of value 617*b* from layer B 630, which overrides the opinion of value 617*a* from layer A 605.

Attribute D 618*c* in authored state 650 of component is not associated with any task membership attributes by layers A 605 or B 630. Therefore, attribute D 618*c* may not be associated with any task membership attributes. In a further embodiment, attribute D 618*c* may inherit a task association from a task membership attribute associated directly with component A or another component associated with component A, such as a parent component in a hierarchy of components.

The ability to assign, modify, and override task membership values in layers enables users to associate tasks with components as they build the scene description. Furthermore, different users in the digital production pipeline may have different levels of technical expertise. The use of layers to specify components' associations with tasks enables the users at earlier stages of the digital production pipeline to specify custom tasks and interfaces for users at later stages of the digital production pipeline. Custom tasks and their associated interfaces can provide enhanced ease of use, facilitate the expression of artistic intent, and prevent errors arising from the mistaken alteration of component attributes.

In a further embodiment, layer data structures can be combined with task membership values to further enable the enforcement of policies about the locations in the digital production pipeline where components and portions thereof can be accessed or modified to prevent the inadvertent introduction of errors. As described above, layer data structures can be assigned to specific stages of the digital production pipeline. This assignment may be done informally at each stage of digital production pipeline and/or empty layers created in early stages of the digital production pipeline may be earmarked as placeholders for later stages of the digital production pipeline.

In an embodiment, layer data structures can be assigned task restriction. The task restriction value of a layer data structure specifies the components or attributes thereof that may be modified by the layer data structure. In this embodiment, a layer data structure can only specify values for attributes of components that have a task membership value matching at least part of the task restriction value of the layer data structure.

Figure 7:
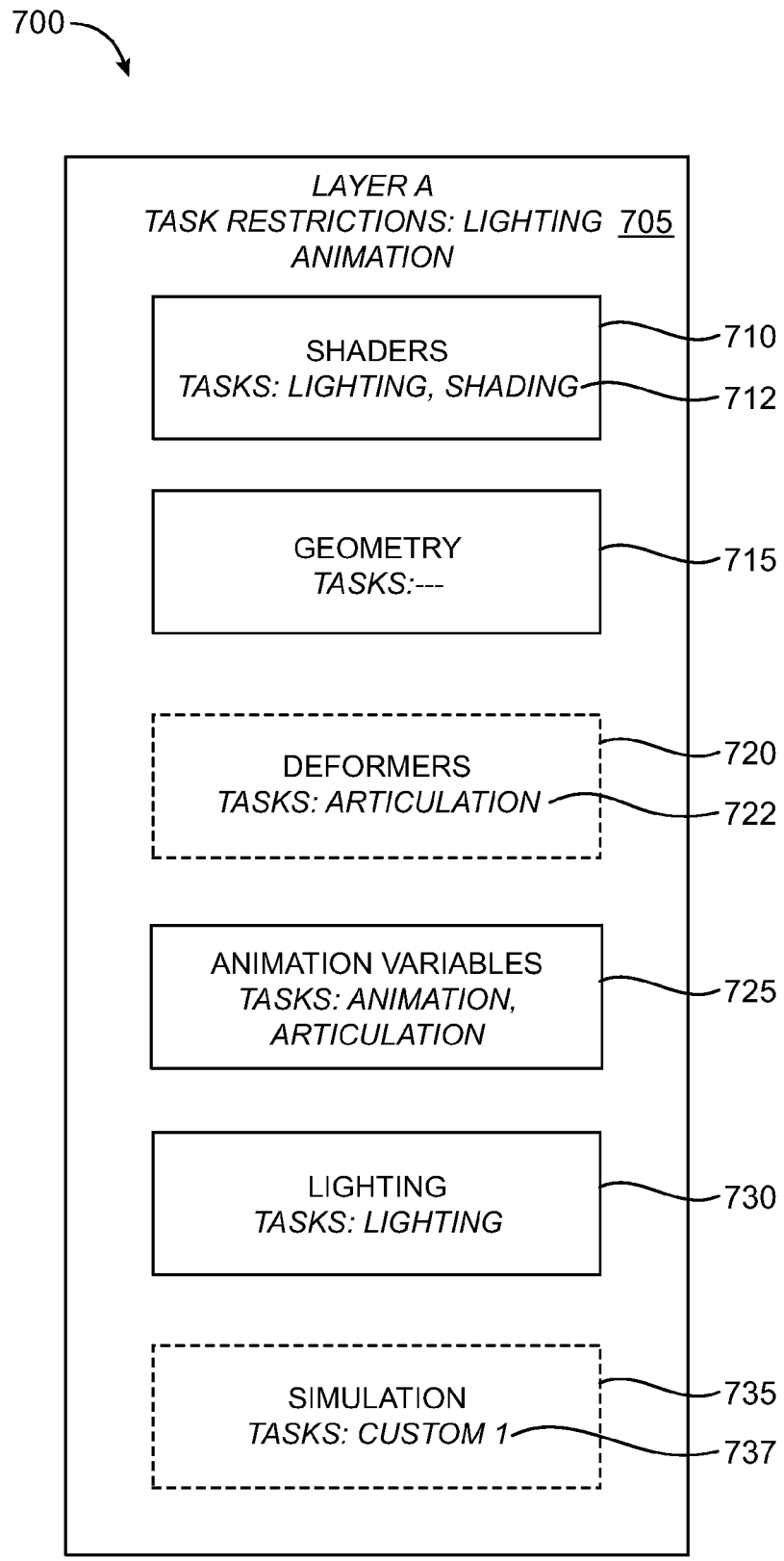
FIG. 7 illustrates a layer data structure according to an embodiment of the invention.

FIG. 7 illustrates an example layer data structure 700 according to an embodiment of the invention. Example layer data structure has a task restriction value 705 of "lighting, animation", which indicates that it can only specify values for attributes of components also having a task membership value of "lighting" and/or "animation." In this example, components that do not have either of these task membership values cannot be modified by example layer data structure 700.

For example, shaders component 710 includes a task membership value 712 of "lighting, shading." As the task membership of component 710 and the task restriction of layer data structure 700 both include the task of "lighting", layer data structure 700 can specify attribute values for component 710. Similarly, geometry component 715, animation component 725, and lighting component 730 also have task membership values including either "lighting" and/or "animation." Thus, layer data structure 700 can specify the attribute values of these components.

In contrast, articulation component 720 has a task membership value 722 of "articulation." Simulation component 735 has a task membership value 737 of "custom 1." As the task membership values of components 720 and 735 do not include either "lighting" and/or "animation", example layer data structure 700 cannot specify the attribute values of components 720 and 735.

Thus, by specifying task restriction values for layer data structures, an embodiment of the invention can enforce policies on where attribute values of specific components can be set. In further embodiments, system 100 or individual applications 105, 110, and 115 can restrict users' access to layers based upon users' identities, assigned departments, task selections, and/or any other access control technique.

Figure 3:
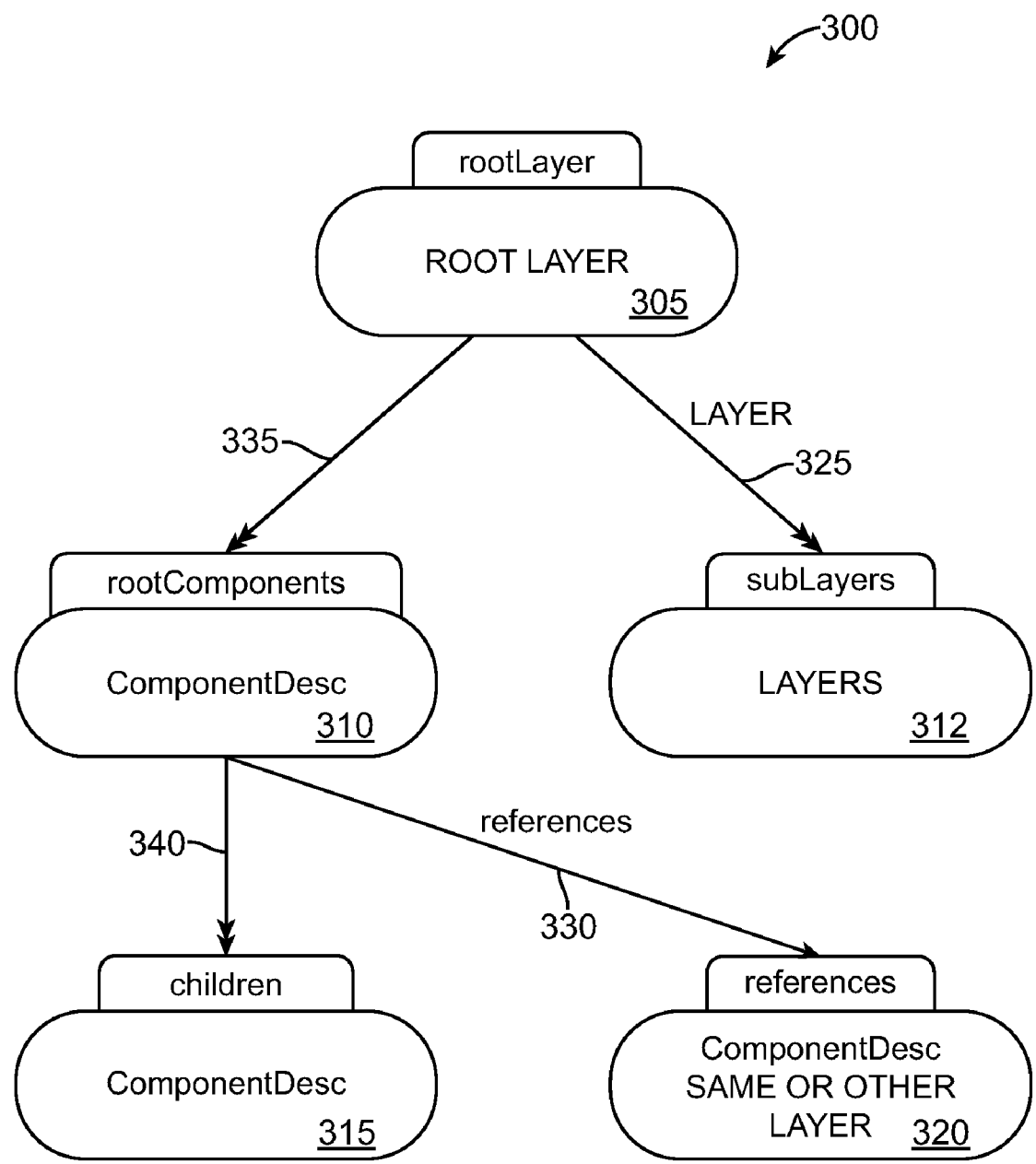
FIG. 3 illustrates a scene description data structure representing the state of a component according to an embodiment of the invention.

FIG. 3 illustrates a scene description data structure 300 representing the authored state of components in one or more scenes according to an embodiment of the invention. The authored state is the set of attribute values apart from any default or application-provided fallback attribute values for one or more components. The scene description data structure 300 specifies a graph or set of relationships between components as well as layer data structures specifying opinions of attribute values of components for one or more scenes. For a graph of relationships, components and layer data structures are referred to generally as nodes.

In an embodiment, the scene description data structure 300 combines two different aspects: a layer data structure, as described above, and cross-references to components. The layer data structure enables the progressive refinement and incremental modification of components as needed. The references to components enables the encapsulation and reuse of components. Together, this combination enables: scene modification at any point of the digital production pipeline, in any order, without any loss of data in upstream or downstream activities of the digital production pipeline; unrestricted and progressive modification and refinement of components; and a unified system of scene specification and modification that enables any aspects of the scene to be added, removed, reused, or modified at any point of the digital production pipeline.

In an embodiment, scene description data structure 300 specifies the relationships between components and layer data structures, which express opinions of component attribute values, in a hierarchical graph structure. Nodes of scene description data structure 300 may correspond with components, such as data representing geometry, texturing, shading, articulation, animation, simulation, layout, lighting, or rendering, or with layer data structures.

In an embodiment, the hierarchical graph structure includes three different types of relationships between components and layers: namespace relationships, layer relationships, and reference relationships. Namespace relationships establish the namespace or other nomenclature used to identify and organize components. Namespace relationships are used to assign components' identities, to match up components from different layers that should override each other, and to provide the scope of inclusion for references. Alternative embodiments can utilize other attributes, such as globally unique identifiers (GUIDs), to arrange components and layer data structures within the scene description data structure.

Layer relationships specify the relationship between a layer data structure and one or more sublayers. Layer relationships specify the layer stacking order used to composite or combine layers to determine attribute values of components.

Reference relationships provide links to components specified elsewhere. A reference relationship from a first component in a first layer data structure can reference a second component defined in the same layer data structure, a second component in another layer data structure associated with the first layer data structure, or a second component in another layer data structure that is not associated with the first layer data structure. Implementations of reference relationships can be restricted to directly referencing only the root component in another layer data structure (with any child components referenced implicitly using namespace relationships associated with the root component) or alternatively can be unrestricted to allow direct referencing of any arbitrary component in another layer data structure.

In an embodiment, the scene description data structure 300 includes a root layer 305 for the scene. In an embodiment, the relationships of the hierarchical graph between components and layer data structures are specified, at least in part, by root layer 305. Child nodes, such as root component 310 and sublayers hierarchy 312 can be directly associated with the root layer 305.

In an embodiment of the hierarchical graph, each non-empty layer data structure, including the root layer 305, includes at least one root component, such as root component 310. Additional components within the layer data structure are associated as child nodes (or grandchild or other descendant nodes) of the root component. As an example of this embodiment, one or more additional components 315 are associated via namespace relationships 340 as descendant nodes of root component 310.

In an embodiment, the namespace relationships 340 between component nodes in a layer are specified in the form of relationship attributes of components. For example, component 315 can include a parent attribute, which would be set to reference component 310. In another embodiment, a component can include a child relationship attribute specifying one or more child components of the component. For example, root component 310 can include a child relationship attribute, which would be set to reference components 315.

In an embodiment of the hierarchical graph, each additional layer data structure of the scene description data structure is a descendant, or sublayer, of the root layer. As an example of this embodiment, the root layer 305 is associated with one or more additional layer data structures 312 via layer relationships 325. In an embodiment, the arrangement of layer data structures 312 relative to the root layer 305 and each other specifies the layer stacking order used to combine and override opinions of component attribute values to form the composite layer. Although omitted for clarity, in an embodiment of the scene description data structure, each additional layer data structure that is not empty includes its own root component, similar to root component 310. Furthermore, sublayers can include additional components associated with their respective root components via namespace relationships.

In a further embodiment, reference relationships, such as reference relationship 330, provides a link to one or more components specified elsewhere. A reference relationship from a first component in a first layer data structure can reference a second, target component 320 defined in the same layer data structure, in another layer data structure associated with the first layer data structure, or in another layer data structure that is not associated with the first layer data structure. Implementations of reference relationships 330 can be restricted to target only the root component in another layer data structure (with any child components referenced implicitly) or alternatively can be unrestricted to directly referencing any arbitrary target component in another layer data structure.

In an embodiment, the graph, or set of relationships between components and layers, defined by the scene description data structure 300 can be orthogonal, or completely independent, of any other optional graphs associated with the same components. Graphs can be used to define different sets of relationships for the same components in different scenes. For example, a second scene description data structure can be created to specify different relationships between components for additional scenes. Additional layers included in the second scene description data structure can further specify different attribute values for the components.

In an embodiment, relationship attributes of components can also specify functional relationship between components. For example, relationships between coordinate transformation components can specify a specific sequence for applying transformations to models. In a further embodiment, relationship attributes can include additional data defining some parameter of a relationship. For example, a light source component can be related to a first model component, which indicates that the light source component provides light to the model component. The lighting relationship between these two components can further include a light intensity value to indicate the intensity of light from the light source on the first model. If a second lighting relationship is created between the light source component and a second model component, the second lighting relationship can include a different light intensity value.

As described above, different layers can be specified in different portions of the digital production pipeline, enabling components to be revised or refined without the need for explicit change isolation or versioning and without destroying the data previously specified for the component in weaker layers. This allows an independent variation of a component to be created and used without affecting the usage elsewhere of either the original component or any other variation of the same component. Moreover, because layers can express opinions of value for any attribute of a component, there are no restrictions on the type or extent of modifications permitted on referenced components. Furthermore, scene description data structures can include reference relationships to all or a portion of a component's layer data structure, enabling other scenes to encapsulate, reuse, and optionally modify the example character model component as defined by its layers at any point of the digital production pipeline.

Although the above described systems and methods have been described with reference to components, digital assets, and digital production pipelines, the scene description data structure and its layering and referencing relationships can be generalized for use with applications and data of any type, including text and word processing data; spreadsheet data; database tables and objects; engineering blueprints, schematics, and specifications; and object-orientated data structures. The generalized forms of these data structures and the above-described methods of manipulating these data structures are particularly useful in non-linear workflows. Nonlinear workflows can include collaborative working environments in which multiple users work on the same data. Nonlinear workflows can also enable one or more users to generate multiple variations of the data at any arbitrary point of the workflow without destroying data associated with previous or subsequent portions of the workflow. For example, a user could use the above described systems and methods to create multiple financial scenarios within a spreadsheet application based on a common set of initial conditions.

Figure 8:
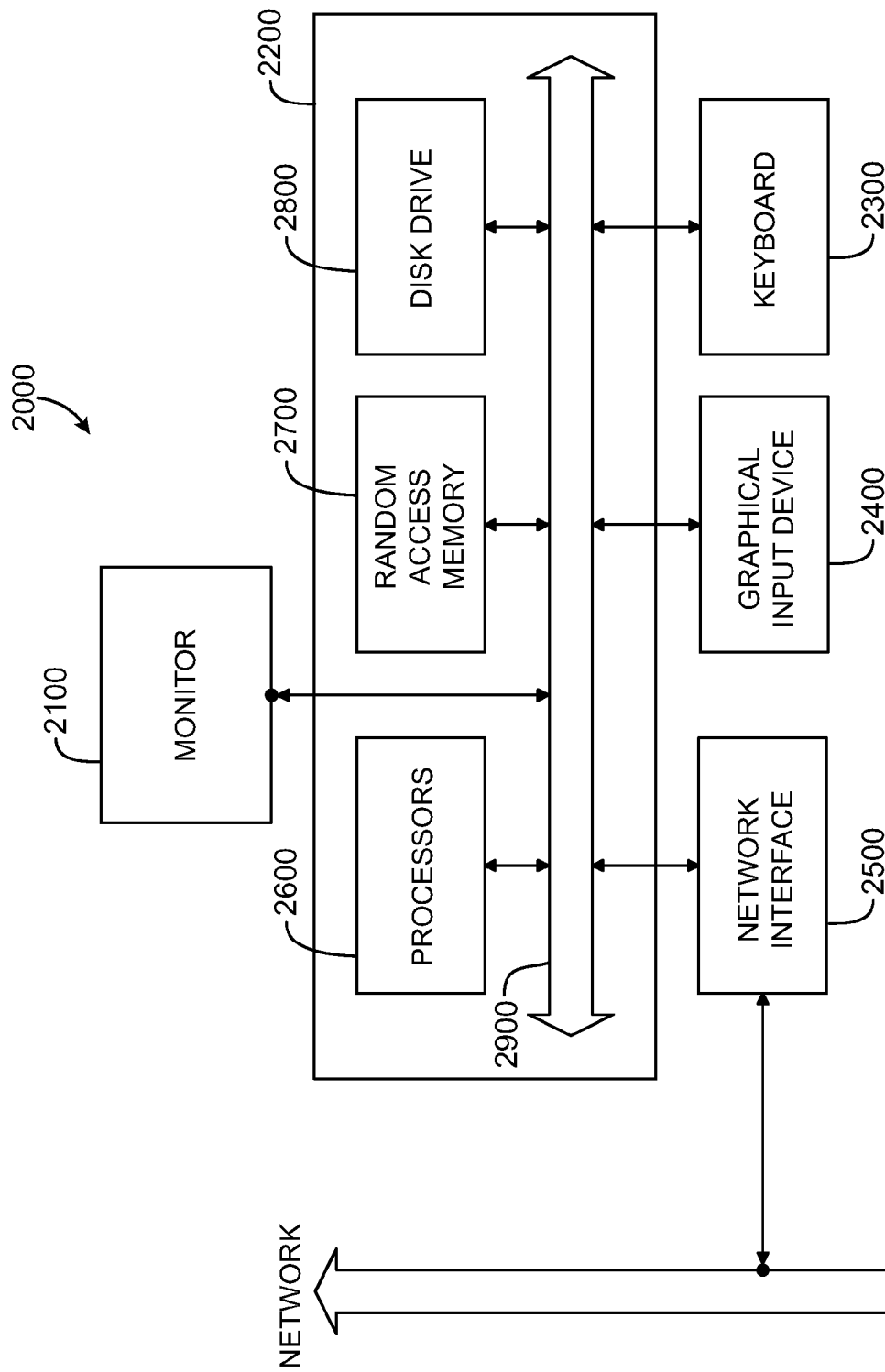
FIG. 8 illustrates a computer system suitable for implementing an embodiment of the invention.

FIG. 8 illustrates a computer system 2000 suitable for implementing an embodiment of the invention. Computer system 2000 typically includes a monitor 2100, computer 2200, a keyboard 2300, a user input device 2400, and a network interface 2500. User input device 2400 includes a computer mouse, a trackball, a track pad, graphics tablet, touch screen, and/or other wired or wireless input devices that allow a user to create or select graphics, objects, icons, and/or text appearing on the monitor 2100. Embodiments of network interface 2500 typically provides wired or wireless communication with an electronic communications network, such as a local area network, a wide area network, for example the Internet, and/or virtual networks, for example a virtual private network (VPN).

Computer 2200 typically includes components such as one or more processors 2600, and memory storage devices, such as a random access memory (RAM) 2700, disk drives 2800, and system bus 2900 interconnecting the above components. Processors 2600 can include one or more general purpose processors and optional special purpose processors for processing video data, audio data, or other types of data. RAM 2700 and disk drive 2800 are examples of tangible media for storage of data, audio/video files, computer programs, applet interpreters or compilers, virtual machines, and embodiments of the herein described invention. Other types of tangible media include floppy disks; removable hard disks; optical storage media such as DVD-ROM, CD-ROM, and bar codes; non-volatile memory devices such as flash memories; read-only-memories (ROMS); battery-backed volatile memories; and networked storage devices.

Further embodiments can be envisioned to one of ordinary skill in the art after reading the attached documents. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A data structure for representing at least one component, the data structure embedded in a non-transitory computer-readable data storage medium, the data structure comprising:
    a first layer including a first component attribute value specifying a first characteristic of the component;
    a first task membership value specifying at least a first task included in a first set of tasks associated with at least the first component attribute value, wherein the first task is included in a plurality of predefined tasks;
    a second layer including a second component attribute value specifying a second characteristic of the component;
    a second task membership value specifying at least a second task included in a second set of tasks associated with at least the second component attribute value, wherein the second task is included in the plurality of predefined tasks; and
    a third layer including an additional task membership value modifying the first set of tasks associated with the first component attribute value, wherein the third layer includes a layer relationship that is stronger than the first layer such that the additional task membership value adds, removes, or overrides at least one of the plurality of predefined tasks included in the first set of tasks associated with the first component attribute value.

2. The data structure of claim 1, wherein the first layer includes the first task membership value and the second layer includes the second task membership value, wherein each of the first and second layers define task membership values associating component attribute values with any combination of the plurality of predefined tasks.

3. The data structure of claim 1, wherein the first task membership value is associated directly with the component.

4. The data structure of claim 1, wherein the first task membership value is associated with a parent component of the component.

5. The data structure of claim 1, wherein the second layer includes a third task membership value associating the first component attribute value with a third task of the plurality of tasks.

6. The data structure of claim 5, wherein the third task membership value overrides the first task membership value.

7. The data structure of claim 5, wherein first component attribute value is also associated with the first task.

8. The data structure of claim 1, wherein at least a portion of the plurality of tasks correspond with predefined activities in a digital production pipeline.

9. The data structure of claim 1, wherein at least a portion of the plurality of tasks correspond with a user-defined task.

10. The data structure of claim 1, wherein the first layer includes a first layer task restriction value associating the first task with the first layer; and
    wherein the first layer task restriction value enables the first layer to specify component attribute values associated with the first task and prohibits the first layer from specifying component attribute values not associated with the first task.

11. A data structure for representing at least one component, the data structure embedded in a non-transitory computer-readable data storage medium, the data structure comprising:
    a first layer specifying a first opinion of value of a first attribute of a component;
    a first task membership value associating the first attribute with a first task; and
    a second layer having a first layer task restriction value associating at least the first task with the second layer;
    wherein the first layer task restriction value enables the second layer to specify an opinions of value of attributes of components associated with the first task;
    wherein the first layer includes a second opinion of value specifying the first task membership value;
    wherein the second layer includes a third opinion of value of the first task membership value associating the first attribute of the component with a second task; and
    wherein the relationship between the first layer and the second layer specifies that the third opinion of value of the first task membership value overrides the second opinion of value of the first task membership value, such that the first attribute of the component is associated with the second task; and
    a third layer including an additional task membership value modifying a set of tasks including the first task associated with the first attribute, wherein the third layer includes a layer relationship that is stronger than the first layer such that the additional task membership value adds, removes, or overrides at least one of the set of tasks associated with the first attribute.

12. The data structure of claim 11, wherein the second layer includes a second opinion of value of the first attribute of the component.

13. The data structure of claim 11, wherein the first layer includes:
    a second opinion of value of a second attribute of the component and a second task membership value associating the second attribute with a second task; and
    wherein the first layer task restriction value prohibits the second layer from specifying an opinion of value of the second attribute of the component.

14. The data structure of claim 13, wherein the data structure is adapted to be accessed by logic associated with a digital production pipeline application, wherein the logic prevents access to the second attribute of the component via the second layer.

15. The data structure of claim 11, wherein the at least one task specified by the first task membership value corresponds with a predefined activity in a digital production pipeline.

16. The data structure of claim 11, wherein the at least one task specified by the first task membership value corresponds with a user-defined task.

17. The data structure of claim 11, wherein the data structure is adapted to be accessed by logic associated with a user interface, wherein the logic filters the component according to the task membership value.

* * * * *